United States Patent
Chisholm et al.

(10) Patent No.: US 7,087,659 B2
(45) Date of Patent: *Aug. 8, 2006

(54) CURABLE (METH)ACRYLATE COMPOSITIONS

(75) Inventors: Bret Ja Chisholm, Clifton Park, NY (US); Anne Herrmann, Glenview, IL (US)

(73) Assignee: General Electrical, Pittsfield, MA (US)

( * ) Notice: Subject to any disclaimer, the term of this patent is extended or adjusted under 35 U.S.C. 154(b) by 86 days.

This patent is subject to a terminal disclaimer.

(21) Appl. No.: 10/828,727

(22) Filed: Apr. 21, 2004

(65) Prior Publication Data

US 2004/0242720 A1   Dec. 2, 2004

Related U.S. Application Data

(63) Continuation-in-part of application No. 10/249,998, filed on May 27, 2003, now Pat. No. 6,833,391.

(51) Int. Cl.
*C08F 2/46* (2006.01)
*C08F 20/22* (2006.01)

(52) U.S. Cl. ............... 522/64; 522/103; 522/182; 522/180; 526/328; 526/329.7; 526/292.3; 428/64.4

(58) Field of Classification Search ............... 522/64, 522/103, 180, 182; 526/328, 329.7, 292.3
See application file for complete search history.

(56) References Cited

U.S. PATENT DOCUMENTS

| | | |
|---|---|---|
| 3,277,053 A | 10/1966 | Hill et al. |
| 3,824,293 A | 7/1974 | Brode |
| 4,059,618 A | 11/1977 | Blumenfeld et al. |
| 4,198,465 A | 4/1980 | Moore et al. |
| 4,420,527 A | 12/1983 | Conley |
| 4,576,850 A | 3/1986 | Martens |
| 4,578,445 A | 3/1986 | Sakagami et al. |
| 4,582,885 A | 4/1986 | Barber |
| 4,668,558 A | 5/1987 | Barber |
| 4,710,557 A | 12/1987 | Warren |
| 4,721,377 A | 1/1988 | Fukuda et al. |
| 4,812,032 A | 3/1989 | Fukuda et al. |
| 4,970,135 A | 11/1990 | Kushi et al. |
| 5,175,030 A | 12/1992 | Lu et al. |
| 5,183,597 A | 2/1993 | Lu |
| 5,239,026 A | 8/1993 | Babirad et al. |
| 5,284,736 A | 2/1994 | Kushi et al. |
| 5,395,900 A | 3/1995 | Liaw et al. |
| 5,424,339 A | 6/1995 | Zanka et al. |
| 5,450,235 A | 9/1995 | Smith et al. |
| 5,470,892 A | 11/1995 | Gupta et al. |
| 5,479,555 A | 12/1995 | Rot et al. |
| 5,518,789 A | 5/1996 | Burns et al. |
| 5,626,800 A | 5/1997 | Williams et al. |
| 5,635,278 A | 6/1997 | Williams |
| 5,691,846 A | 11/1997 | Benson, Jr. et al. |
| 5,714,218 A | 2/1998 | Nishio et al. |
| 5,716,681 A | 2/1998 | Williams |
| 5,855,983 A | 1/1999 | Williams |
| 5,883,607 A | 3/1999 | Williams |
| 5,891,931 A | 4/1999 | Leboeuf et al. |
| 5,900,287 A | 5/1999 | Williams |
| 5,908,874 A | 6/1999 | Fong et al. |
| 5,932,626 A | 8/1999 | Fong et al. |
| 5,969,867 A | 10/1999 | Fukushima et al. |
| 5,981,113 A | 11/1999 | Christian |
| 5,988,820 A | 11/1999 | Huang et al. |
| 6,005,137 A | 12/1999 | Moore et al. |
| 6,051,733 A | 4/2000 | Weissman |
| 6,107,364 A | 8/2000 | Fong et al. |
| 6,114,010 A | 9/2000 | Williams |
| 6,206,550 B1 | 3/2001 | Fukushima et al. |
| 6,218,074 B1 | 4/2001 | Dueber et al. |
| 6,228,500 B1 | 5/2001 | Hiroshige et al. |
| 6,232,359 B1 | 5/2001 | Christian |
| 6,280,063 B1 | 8/2001 | Fong et al. |
| 6,310,161 B1 | 10/2001 | Weissman |
| 6,313,187 B1 | 11/2001 | LeBoeuf et al. |
| 6,313,245 B1 | 11/2001 | Moore |
| 6,329,485 B1 | 12/2001 | Vanderbilt |
| 6,350,035 B1 | 2/2002 | Smith et al. |
| 6,355,754 B1 | 3/2002 | Olson et al. |
| 6,368,682 B1 | 4/2002 | Fong |
| 6,428,889 B1 | 8/2002 | Nagaoka |
| 6,503,564 B1 | 1/2003 | Fleming et al. |
| 6,833,391 B1 * | 12/2004 | Chisholm et al. ............ 522/28 |
| 2001/0025086 A1 | 9/2001 | LeBoeuf et al. |
| 2002/0123589 A1 | 9/2002 | Olson et al. |
| 2002/0126382 A1 | 9/2002 | Smith et al. |
| 2002/0132928 A1 | 9/2002 | Soane et al. |
| 2002/0192459 A1 | 12/2002 | Bacon, Jr. |
| 2003/0224250 A1 | 12/2003 | Setthachayanon et al. |
| 2005/0049376 A1 * | 3/2005 | Chisholm et al. ........... 526/256 |

FOREIGN PATENT DOCUMENTS

EP    0430722    3/1990

(Continued)

OTHER PUBLICATIONS

JP3153715 (abstract) Published Jul. 1, 19991.

(Continued)

*Primary Examiner*—Susan Berman

(57) ABSTRACT

A curable composition includes a multifunctional (meth) acrylate; a substituted or unsubstituted arylether (meth) acrylate monomer; and a polymerization initiator. The compositions exhibit high refractive indices and, upon polymerization, the compositions provide films having excellent thermomechanical properties.

24 Claims, No Drawings

FOREIGN PATENT DOCUMENTS

| | | |
|---|---|---|
| EP | 0406590 | 12/1990 |
| EP | 0247861 | 12/1992 |
| EP | 0759448 | 8/1995 |
| EP | 0708164 | 4/1996 |
| EP | 1014113 | 12/1999 |
| JP | 02247212 | 10/1990 |
| JP | 02258819 | 10/1990 |
| JP | 2001172253 | 6/2001 |
| JP | 200297217 | 3/2002 |
| WO | WO 98/50805 | 11/1998 |
| WO | WO 01/30933 | 5/2001 |
| WO | WO 02/051892 | 7/2002 |
| WO | WO 2003076528 | 9/2003 |

OTHER PUBLICATIONS

JP4285654 (abstract) Piblished Oct. 9, 1992.
JP5287040 (abstract) Published Nov. 2, 1993.
JP59136310 (abstract) Published Aug. 4, 1984.
JP2000009901 (abstract) PublishedJan. 14, 2000.
Beecroft, et al., High Refractive Index Polymers for Optical Applications, J.M.S. Pure Appl, Chem. A34(4), pp. 573-586.
Zwiers, et al., Replication of High Precision Aspherical Lenses Using UV-Curable Coatings, Conference location: Limburg, Neth., Conference Date: Apr. 14, 1985, Source: Pub. by Elsevier Applied Science Publ., London, Eng. and New York, NY.
International Search Report; International Application No: PCT/US2004/016771;International Filing Date May 26, 2004; Date of Mailing Oct. 15, 2005;(6pgs).
JP2000009901; Jan. 14, 2000; Abstract, only one (1) page.

\* cited by examiner

CURABLE (METH)ACRYLATE COMPOSITIONS

CROSS-REFERENCE TO RELATED APPLICATIONS

This application is a Continuation-in-part of application Ser. No. 10/249,998 filed May 27, 2003 now U.S. Pat. No. 6,833,391.

BACKGROUND OF INVENTION

Disclosed herein are curable (meth)acrylate compositions and, more specifically ultraviolet (UV) radiation curable (meth)acrylate compositions. The compositions are suitable for optical articles and particularly for light management films.

In backlight computer displays or other display systems, optical films are commonly used to direct light. For example, in backlight displays, light management films use prismatic structures (often referred to as microstructure) to direct light along a viewing axis (i.e., an axis substantially normal to the display). Directing the light enhances the brightness of the display viewed by a user and allows the system to consume less power in creating a desired level of on-axis illumination. Films for turning or directing light can also be used in a wide range of other optical designs, such as for projection displays, traffic signals, and illuminated signs.

Compositions used to form light management films to direct light desirably have the ability to replicate the microstructure needed to provide the light directing capability upon cure. It is furthermore desirable for the glass transition temperature (Tg) of the cured composition to be high enough for shape retention during storage and use. It is also desirable for light management films made from the cured composition to exhibit high brightness. Finally, the composition used to make light management film advantageously provides a cured composition having a high refractive index (RI). While a variety of materials are presently available for use in light management films, there remains a continuing need for still further improvement in the materials used to make them, particularly materials that upon curing possess the combined attributes desired to satisfy the increasingly exacting requirements for light management film applications.

SUMMARY OF INVENTION

The above-described needs are alleviated by a curable composition comprising a multifunctional (meth)acrylate; a substituted or unsubstituted arylether (meth)acrylate monomer, especially an arylthioether (meth)acrylate; and a polymerization initiator.

The above-described needs are also alleviated by a curable composition comprising a multifunctional (meth)acrylate; a substituted or unsubstituted arylether (meth)acrylate monomer; a brominated aromatic (meth)acrylate monomer; and a polymerization initiator.

In one embodiment, a curable composition comprises a multifunctional (meth)acrylate represented by the formula:

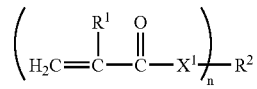

wherein $R^1$ is hydrogen or methyl; $X^1$ is O or S; n is at least 2; and $R^2$ is represented by the formula:

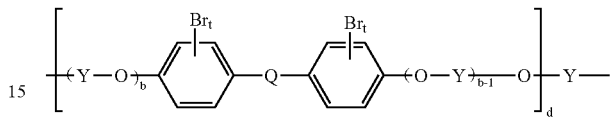

wherein Q is $-C(CH_3)_2-$, $-CH_2-$, $-C(O)-$, $-S(O)-$, or $-S(O)_2-$; Y is divalent $C_1-C_6$ alkyl or hydroxy substituted divalent $C_1-C_6$ alkyl; b is independently at each occurrence 1 to 10; t is independently at each occurrence 0, 1, 2, 3, or 4; and d is 1 to 3; a substituted or unsubstituted arylether (meth)acrylate monomer according to the formula:

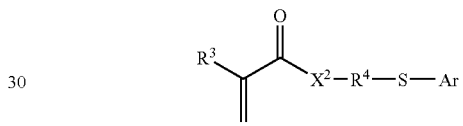

wherein $R^3$ is hydrogen or methyl; $X^2$ is O or S; $R^4$ is substituted or unsubstituted divalent $C_1-C_6$ alkyl or alkenyl; Ar is substituted or unsubstituted $C_6-C_{12}$ aryl, including phenyl; wherein the substitution on the $R^4$ and Ar independently include fluorine, chlorine, bromine, iodine, $C_1-C_6$ alkyl, $C_1-C_3$ perhalogenated alkyl, hydroxy, $C_1-C_6$ ketone, $C_1-C_6$ ester, N,N—$(C_1-C_3)$ alkyl substituted amide, or a combination comprising at least one of the forgoing substituents; and a polymerization initiator.

In another embodiment, a curable composition consists essentially of a multifunctional (meth)acrylate represented by the formula:

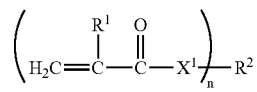

wherein $R^1$ is hydrogen or methyl; $X^1$ is O or S; n is at least 2; and $R^2$ is represented by the formula:

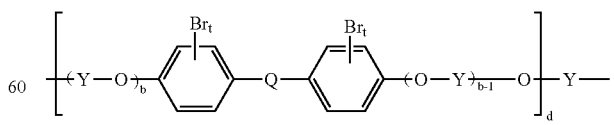

wherein Q is $-C(CH_3)_2-$, $-CH_2-$, $-C(O)-$, $-S(O)-$, or $-S(O)_2-$; Y is divalent $C_1-C_6$ alkyl or hydroxy substituted divalent $C_1-C_6$ alkyl; b is independently at each occurrence 1 to 10; t is independently at each occurrence 0, 1, 2, 3, or 4; and d is 1 to 3; a substituted or unsubstituted arylether (meth)acrylate monomer according to the formula:

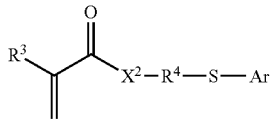

wherein $R^3$ is hydrogen or methyl; $X^2$ is O or S; $R^4$ is substituted or unsubstituted divalent $C_1$–$C_6$ alkyl or alkenyl; Ar is substituted or unsubstituted $C_6$–$C_{12}$ aryl, including phenyl; wherein the substitution on the $R^4$ and Ar independently include fluorine, chlorine, bromine, iodine, $C_1$–$C_6$ alkyl, $C_1$–$C_3$ perhalogenated alkyl, hydroxy, $C_1$–$C_6$ ketone, $C_1$–$C_6$ ester, N,N—($C_1$–$C_3$) alkyl substituted amide, or a combination comprising at least one of the forgoing substituents; and a polymerization initiator.

A curable composition, comprises a multifunctional (meth)acrylate represented by the formula:

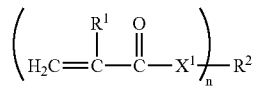

wherein $R^1$ is hydrogen or methyl; $X^1$ is O or S; n is at least 2; and $R^2$ is represented by the formula:

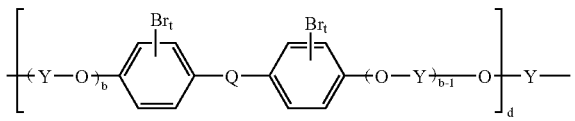

wherein Q is —C(CH$_3$)$_2$—, —CH$_2$—, —C(O)—, —S(O)—, or —S(O)$_2$—; Y is divalent $C_1$–$C_6$ alkyl or hydroxy substituted divalent $C_1$–$C_6$ alkyl; b is independently at each occurrence 1 to 10; t is independently at each occurrence 0, 1, 2, 3, or 4; and d is 1 to 3; a substituted or unsubstituted arylether (meth)acrylate monomer represented by the formula:

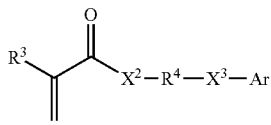

wherein $R^3$ is hydrogen or methyl; $X^2$ is O or S; $X^3$ is O or S; $R^4$ is substituted or unsubstituted divalent $C_1$–$C_6$ alkyl or alkenyl; Ar is substituted or unsubstituted $C_6$–$C_{12}$ aryl, including phenyl; wherein the substitution on the $R^4$ and Ar independently include fluorine, chlorine, bromine, iodine, $C_1$–$C_6$ alkyl, $C_1$–$C_3$ perhalogenated alkyl, hydroxy, $C_1$–$C_6$ ketone, $C_1$–$C_6$ ester, N,N—($C_1$–$C_3$) alkyl substituted amide, or a combination comprising at least one of the forgoing substituents; a brominated aromatic (meth)acrylate monomer represented by the formula:

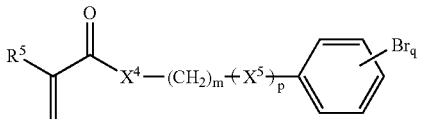

wherein $R^5$ is hydrogen or methyl; $X^4$ is O or S; $X^5$ is O or S; m is 1, 2, or 3; p is 0 or 1; and q is 4 or 5; and a polymerization initiator.

Other embodiments, including a method of preparing a curable composition, a cured composition comprising the reaction product of the curable composition, and articles comprising the cured composition, are described below.

DETAILED DESCRIPTION

It has been unexpectedly discovered that the addition of a substituted or unsubstituted arylthioether (meth)acrylate monomer to a multifunctional (meth)acrylate provides a curable composition having excellent RI as well as providing improved brightness when cured into a microstructured film as compared to an analogous composition based on a substituted or unsubstituted arylether (meth)acrylate monomer.

It has also been unexpectedly discovered that the addition of a brominated aromatic (meth)acrylate monomer to a multifunctional (meth)acrylate and a substituted or unsubstituted arylether (meth)acrylate monomer in the presence of a polymerization initiator provides a composition having improved RI. Furthermore, upon curing the cured composition exhibits improved Tg. Finally, a cured, microstructured film made from the curable composition exhibits improved brightness compared to cured, microstructured film made from curable compositions lacking the brominated aromatic (meth)acrylate monomer.

As used herein, "(meth)acrylate" is inclusive of both acrylate and methacrylate functionality, in addition to thioester(meth)acrylate functionality (for example, CH$_2$=CH(R)(C=O)S—, wherein R is hydrogen or methyl).

The terms "a" and "an" herein do not denote a limitation of quantity, but rather denote the presence of at least one of the referenced item. All ranges disclosed herein are inclusive and combinable.

In one aspect, the curable composition is a solventless, high refractive index, radiation curable composition that provides a cured material having an excellent balance of properties. The compositions are ideally suited for light management film applications. In one aspect, light management films prepared from the curable compositions exhibit good brightness.

The curable compositions comprise a multifunctional (meth)acrylate, i.e., a molecule containing at least two (meth)acrylate functional groups. In a preferred embodiment, the multifunctional (meth)acrylate is represented by the formula (I)

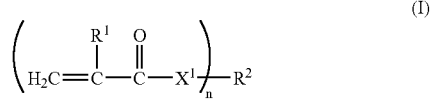

(I)

wherein $R^1$ is hydrogen or methyl; $X^1$ is O or S; $R^2$ is substituted or unsubstituted $C_1$–$C_{300}$ alkyl, aryl, alkaryl, arylalkyl, or heteroaryl; and n is 2, 3, or 4. The substitution on $R^2$ includes, but is not limited to, fluorine, chlorine, bromine, iodine, $C_1$–$C_6$ alkyl, $C_1$–$C_3$ perhalogenated alkyl, hydroxy, $C_1$–$C_6$ ketone, $C_1$–$C_6$ ester, N,N—($C_1$–$C_3$) alkyl substituted amide, or a combination comprising at least one of the forgoing substituents. Preferred $R^2$ groups include such groups as alkylene and hydroxy alkylene disubstituted bisphenol-A or bisphenol-F ethers, especially the brominated forms of bisphenol-A and -F. Suitable $R^2$ groups include those according to the formula (II)

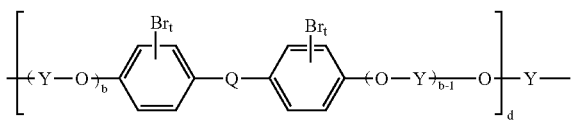

wherein Q is —$C(CH_3)_2$—, —$CH_2$—, —$C(O)$—, —$S(O)$—, or —$S(O)_2$—; Y is divalent $C_1$–$C_6$ alkyl or hydroxy substituted divalent $C_1$–$C_6$ alkyl; b is independently at each occurrence 1 to 10; t is independently at each occurrence 0, 1, 2, 3, or 4; and d is about 1 to about 3.

The multifunctional (meth)acrylates may include compounds produced by the reaction of acrylic or methacrylic acid with a di-epoxide, such as bisphenol-A diglycidyl ether; bisphenol-F diglycidyl ether; tetrabromo bisphenol-A diglycidyl ether; tetrabromo bisphenol-F diglycidyl ether; 1,3–bis-{4-[1-methyl-1-(4-oxiranylmethoxy-phenyl)-ethyl]-phenoxy}-propan-2-ol; 1,3-bis- {2,6-dibromo-4-[1-(3,5-dibromo-4-oxiranylmethoxy-phenyl)-1-methyl-ethyl]-phenoxy}-propan-2-ol; and the like; and a combination comprising at least one of the foregoing di-epoxides. Examples of such compounds include 2,2-bis(4-(2-(meth)acryloxyethoxy)phenyl)propane; 2,2-bis((4-(meth)acryloxy)phenyl)propane; acrylic acid 3-(4-{1-[4-(3-acryloyloxy-2-hydroxy-propoxy)-3,5,-dibromo-phenyl]-1-methyl-ethyl}-2,6-dibromo-phenoxy)-2-hydroxy-propyl ester; acrylic acid 3-[4-(1-{4-[3-(4-{1-[4-(3-acryloyloxy-2-hydroxy-propoxy)-3,5-dibromo-phenyl]-1-methyl-ethyl}-2,6-dibromo-phenoxy)-2-hydroxy-propoxy]-3,5-dibromo-phenyl}-1-methyl-ethyl)-2,6-dibromo-phenoxy]-2-hydroxy-propyl ester; and the like, and a combination comprising at least one of the foregoing multifunctional (meth)acrylates. A suitable multifunctional (meth)acrylate based on the reaction product of tetrabrominated bisphenol-A di-epoxide is RDX 51027 available from UCB Chemicals. Other commercially available multifunctional (meth)acrylates include EB600, EB3600, EB3605, EB3700, EB3701, EB3702, EB3703, and EB3720, all available from UCB Chemicals, or CN104 and CN120 available from Sartomer.

In one embodiment, the multifunctional (meth)acrylate includes those compounds according to the formula (III)

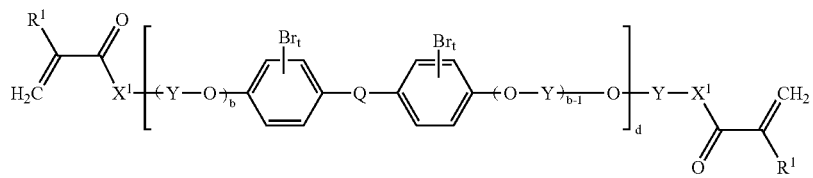

wherein $R^1$ is hydrogen or methyl; $X^1$ is O or S; Q is —$C(CH_3)_2$—, —$CH_2$—, —$C(O)$—, —$S(O)$—, or —$S(O)_2$—; Y is divalent $C_1$–$C_6$ alkyl or hydroxy substituted divalent $C_1$–$C_6$ alkyl; b is 1; t is 2; and d is 1; or wherein $R^1$ is hydrogen or methyl; $X^1$ is O or S; Q is —$C(CH_3)_2$—, —$CH_2$—, —$C(O)$—, —$S(O)$—, or —$S(O)_2$—; Y is divalent $C_1$–$C_6$ alkyl or hydroxy substituted divalent $C_1$–$C_6$ alkyl; b is 1; t is 2; and d is 2; or a combination thereof. Combinations which may make up the multifunctional (meth)acrylate component of the composition include two or more compounds according to the formula (III).

The multifunctional (meth)acrylate is present in the curable composition in an amount of about 25 to about 75 weight percent based on the total composition. Within this range, an amount of greater than or equal to about 35 weight percent may be used, with greater than or equal to about 45 weight percent preferred, and greater than or equal to about 50 weight percent more preferred. Also within this range, an amount of less than or equal to about 70 weight percent may be used, with less than or equal to about 65 weight percent preferred, and less than or equal to about 60 weight percent more preferred.

The curable composition further comprises a substituted or unsubstituted arylether (meth)acrylate monomer. A preferred substituted or unsubstituted arylether (meth)acrylate monomer is represented by the formula (IV)

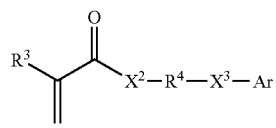

wherein $R^3$ is hydrogen or methyl; $X^2$ is O or S; $X^3$ is O or S; $R^4$ is substituted or unsubstituted divalent $C_1$–$C_6$ alkyl or alkenyl; Ar is substituted or unsubstituted $C_6$–$C_{12}$ aryl, including phenyl; wherein the substitution on the $R^4$ and Ar independently include fluorine, chlorine, bromine, iodine, $C_1$–$C_6$ alkyl, $C_1$–$C_3$ perhalogenated alkyl, hydroxy, $C_1$–$C_6$ ketone, $C_1$–$C_6$ ester, N,N—($C_1$–$C_3$) alkyl substituted amide, or a combination comprising at least one of the forgoing substituents. The Ar group, when substituted, may be mono-, di-, tri-, tetra- or penta-substituted. As used herein, "arylether" is inclusive of both arylethers and arylthioethers, also known as arylsulfides, unless otherwise indicated. Particularly preferred substituted or unsubstituted arylether (meth)acrylate monomers include 2-phenoxyethyl (meth)acrylate and 2-phenylthioethyl (meth)acrylate.

The substituted or unsubstituted arylether (meth)acrylate monomer is present in the curable composition in an amount of about 15 to about 70 weight percent based on the total composition. Within this range, it may be preferred to use an amount of greater than or equal to about 20 weight percent, more preferably greater than or equal to about 30 weight percent. Also within this range, it may be preferred to use an amount of less than or equal to about 60 weight percent, more preferably less than or equal to about 50 weight percent, yet more preferably less than or equal to about 40 weight percent.

In one aspect, the composition may comprise two or more substituted or unsubstituted arylether (meth)acrylate monomers of different chemical compounds. In one embodiment, a first substituted or unsubstituted arylether (meth)acrylate monomer comprises the formula (IV) above wherein $X^3$ is S and a second substituted or unsubstituted arylether (meth)acrylate monomer comprising the formula (IV) wherein $X^3$ is O.

The brominated aromatic (meth)acrylate monomer may be present in the curable composition to impart increased refractive index of the curable composition or increased thermomechanical properties (i.e., increased Tg) of the composition upon curing. Useful brominated aromatic (meth)acrylate monomers may be represented by the formula (V)

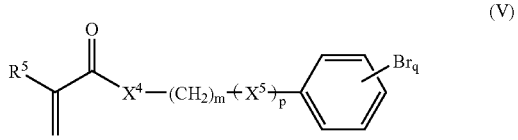

wherein $R^5$ is hydrogen or methyl; $X^4$ is O or S; $X^5$ is O or S; m is 0, 1, 2, or 3; p is 0 or 1; and q is 1, 2, 3, 4, or 5. When m is 0, p is 0. Highly preferred brominated aromatic (meth)acrylate monomers include 2,4,6-tribromobenzyl (meth)acrylate, tetrabromobenzyl (meth)acrylate, tribromophenyl (meth)acrylate, pentabromophenyl (meth)acrylate, and pentabromobenzyl (meth)acrylate.

The brominated aromatic (meth)acrylate monomer may be present in the curable composition in an amount of about 1 to about 20 weight percent based on the total composition. Within this range, an amount of greater than or equal to about 3 weight percent may be used, with an amount of greater than or equal to about 4 preferred, and an amount of greater than or equal to about 5 weight percent more preferred. Also within this range, it may be preferred to use an amount of less than or equal to about 15 weight percent, more preferably less than or equal to about 10 weight percent, yet more preferably less than or equal to about 8 weight percent.

The composition further comprises a polymerization initiator to promote polymerization of the (meth)acrylate components. Suitable polymerization initiators include photoinitiators that promote polymerization of the components upon exposure to ultraviolet radiation. Particularly suitable photoinitiators include phosphine oxide photoinitiators. Examples of such photoinitiators include the IRGACURE® and DAROCUR™ series of phosphine oxide photoinitiators available from Ciba Specialty Chemicals; the LUCIRIN® series from BASF Corp.; and the ESACURE® series of photoinitiators. Other useful photoinitiators include ketone-based photoinitiators, such as hydroxy- and alkoxyalkyl phenyl ketones, and thioalkylphenyl morpholinoalkyl ketones. Also suitable are benzoin ether photoinitiators.

The polymerization initiator may include peroxy-based initiators that may promote polymerization under thermal activation. Examples of useful peroxy initiators include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, alpha,alpha'-bis(t-butylperoxy-m-isopropyl)benzene, 2,5-dimethyl-2,5-di(t-butylperoxy)hexane, dicumylperoxide, di(t-butylperoxy isophthalate, t-butylperoxybenzoate, 2,2-bis(t-butylperoxy)butane, 2,2-bis(t-butylperoxy)octane, 2,5-dimethyl-2,5-di(benzoylperoxy)hexane, di(trimethylsilyl)peroxide, trimethylsilylphenyltriphenylsilyl peroxide, and the like, and combinations comprising at least one of the foregoing polymerization initiators.

In a preferred embodiment, the polymerization initiator comprises a phosphine oxide photoinitiator.

The polymerization initiator may be used in an amount of about 0.01 to about 10 weight percent based on the total weight of the composition. Within this range, it may be preferred to use a polymerization initiator amount of greater than or equal to about 0.1 weight percent, more preferably greater than or equal to about 0.5 weight percent. Also within this range, it may be preferred to use a polymerization initiator amount of less than or equal to about 5 weight percent, more preferably less than or equal to about 3 weight percent.

The composition may, optionally, further comprise an additive selected from flame retardants, antioxidants, thermal stabilizers, ultraviolet stabilizers, dyes, colorants, antistatic agents, surfactant, and the like, and a combination comprising at least one of the foregoing additives, so long as they do not deleteriously affect the polymerization of the composition.

In another embodiment, a curable composition consists of a multifunctional (meth)acrylate according to the formula

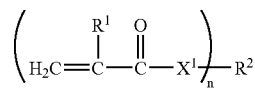

wherein $R^1$ is H or methyl; $X^1$ is O or S; $R^2$ is substituted or unsubstituted $C_1$–$C_{300}$ alkyl, aryl, alkaryl, arylalkyl; or heteroaryl; and n is 2, 3, or 4; a substituted or unsubstituted arylether (meth)acrylate monomer according to the formula

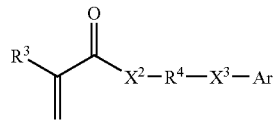

wherein $R^3$ is hydrogen or methyl; $X^2$ is O or S; $X^3$ is S; $R^4$ is substituted or unsubstituted divalent $C_1$–$C_6$ alkyl or alkenyl; Ar is substituted or unsubstituted $C_6$–$C_{12}$ aryl including phenyl; wherein the substitution on the $R^4$ and Ar is, independently, fluorine, chlorine, bromine, iodine, $C_1$–$C_6$ alkyl, $C_1$–$C_3$ perhalogenated alkyl, hydroxy, $C_1$–$C_6$ ketone, $C_1$–$C_6$ ester, N,N—($C_1$–$C_3$) alkyl substituted amide, or a combination comprising at least one of the forgoing substituents; and a polymerization initiator.

In one aspect, the curable composition has a RI greater than or equal to about 1.54, with greater than or equal to about 1.56 preferred, greater than or equal to about 1.58 more preferred, and greater than or equal to about 1.59 most preferred.

In an additional aspect, the cured composition may have a RI greater than or equal to about 1.54, with greater than or equal to about 1.56 preferred, greater than or equal to about 1.58 more preferred, and greater than or equal to about 1.59 most preferred.

In yet another aspect, the cured composition has a Tg of greater than or equal to about 40° C., with greater than or equal to about 60° C. preferred, greater than or equal to about 80° C. more preferred, and greater than or equal to about 90° C. most preferred.

In one embodiment, where the cured composition is the reaction product of a multifunctional (meth)acrylate represented by the formula:

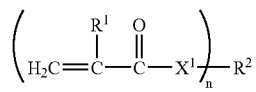

wherein $R^1$ is hydrogen or methyl; $X^1$ is O or S; n is at least 2; and $R^2$ is represented by the formula:

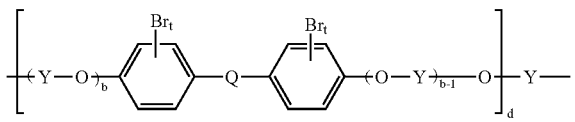

wherein Q is —C(CH$_3$)$_2$—, —CH$_2$—, —C(O)—, —S(O)—, or —S(O)$_2$—; Y is divalent $C_1$–$C_6$ alkyl or hydroxy substituted divalent $C_1$–$C_6$ alkyl; b is independently at each occurrence 1 to 10; t is independently at each occurrence 0, 1, 2, 3, or 4; and d is 1 to 3; and a substituted or unsubstituted arylether (meth)acrylate monomer according to the formula:

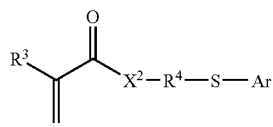

wherein $R^3$ is hydrogen or methyl; $X^2$ is O or S; $R^4$ is substituted or unsubstituted divalent $C_1$–$C_6$ alkyl or alkenyl; Ar is substituted or unsubstituted $C_6$–$C_{12}$ aryl, including phenyl; wherein the substitution on the $R^4$ and Ar independently include fluorine, chlorine, bromine, iodine, $C_1$–$C_6$ alkyl, $C_1$–$C_3$ perhalogenated alkyl, hydroxy, $C_1$–$C_6$ ketone, $C_1$–$C_6$ ester, N,N—($C_1$–$C_3$) alkyl substituted amide, or a combination comprising at least one of the forgoing substituents; the cured composition has a Tg of greater than or equal to about 40° C., with greater than or equal to about 45° C. preferred, and greater than or equal to about 50° C. more preferred.

In another aspect, light management films made from the cured composition containing a brominated aromatic (meth)acrylate monomer exhibits a brightness of greater than or equal to about 1400 candela per meter squared (cd/m$^2$), with greater than or equal to about 1450 cd/m$^2$ preferred, and greater than or equal to about 1490 cd/m$^2$ more preferred.

The compositions provided herein comprising a substituted or unsubstituted arylthioether (meth)acrylate monomer, a multifunctional (meth)acrylate, and a polymerization initiator provide materials having excellent refractive indices without the need for the addition of known high refractive index additives. Such compositions, when cured into microstructured films, thus provide films exhibiting excellent brightness.

The curable composition may be prepared by simply blending the components thereof, with efficient mixing to produce a homogeneous mixture. When forming articles from the curable composition, it is often preferred to remove air bubbles by application of vacuum or the like, with gentle heating if the mixture is viscous. The composition can then be charged to a mold that may bear a microstructure to be replicated and polymerized by exposure to ultraviolet radiation or heat to produce a cured article.

An alternative method includes applying the radiation curable, uncured, composition to a surface of a base film substrate, passing the base film substrate having the uncured composition coating through a compression nip defined by a nip roll and a casting drum having a negative pattern master of the microstructures. The compression nip applies a sufficient pressure to the uncured composition and the base film substrate to control the thickness of the composition coating and to press the composition into full dual contact with both the base film substrate and the casting drum to exclude any air between the composition and the drum. The radiation curable composition is cured by directing radiation energy through the base film substrate from the surface opposite the surface having the composition coating while the composition is in full contact with the drum to cause the microstructured pattern to be replicated in the cured composition layer. This process is particularly suited for continuous preparation of a cured composition in combination with a substrate.

The curable compositions are preferably cured by UV radiation. The wavelength of the UV radiation may be from about 1800 angstroms to about 4000 angstroms. Suitable wavelengths of UV radiation include, for example, UVA, UVB, UVC, UVV, and the like; the wavelengths of the foregoing are well known in the art. The lamp systems used to generate such radiation include ultraviolet lamps and discharge lamps, as for example, xenon, metallic halide, metallic arc, low or high pressure mercury vapor discharge lamp, etc. Curing is meant both polymerization and crosslinking to form a non-tacky material.

When heat curing is used, the temperature selected may be about 80° to about 130° C. Within this range, a temperature of greater than or equal to about 90° C. may be preferred. Also within this range, a temperature of greater than or equal to about 100° C. may be preferred. The heating period may be of about 30 seconds to about 24 hours. Within this range, it may be preferred to use a heating time of greater than or equal to about 1 minute, more preferably greater than or equal to about 2 minutes. Also within this range, it may be preferred to use a heating time of less than or equal to about 10 hours, more preferably less than or equal to about 5 hours, yet more preferably less than or equal to about 3 hours. Such curing may be staged to produce a partially cured and often tack-free composition, which then is fully cured by heating for longer periods or temperatures within the aforementioned ranges.

In one embodiment, the composition may be both heat cured and UV cured.

In one embodiment, the composition is subjected to a continuous process to prepare a cured film material in combination with a substrate. To achieve the rapid production of cured material using a continuous process, the composition preferably cures in a short amount of time. It has been found that compositions containing substituted or unsubstituted bis(4-(meth)acryloylthiophenyl)sulfides exhibit lower cure speeds and/or lower degree of cure than corresponding compositions that are free of such compounds. Accordingly, it is preferred that the curable compositions of this embodiment do not comprise substituted or unsubstituted bis(4-(meth)acryloylthiophenyl)sulfides.

Current manufacturing processes for the low cost production of cured films require rapid and efficient curing of materials. The compositions comprising a substituted or unsubstituted arylthioether (meth)acrylate monomer, a multifunctional (meth)acrylate, especially those corresponding to formulas (I) and (II), and a polymerization initiator have been found to efficiently cure under typical conditions employed for the rapid, continuous production of cured, coated films employing UV irradiation. Such compositions exhibit excellent relative degree of cure under a variety of processing conditions.

The relative degree of cure of the compositions after exposure to a WVA dose of about 0.289 joules/cm$^2$ is greater than about 70 percent, preferably greater than about 80 percent, and yet more preferably greater than about 85 percent. One method of determining the relative degree of cure is provided herein below.

In one embodiment, a curable composition comprises about 35 to about 65 weight percent of a multifunctional (meth)acrylate; about 30 to about 45 weight percent of a substituted or unsubstituted arylether (meth)acrylate monomer; about 1 to about 10 weight percent of a brominated aromatic (meth)acrylate monomer; and about 0.1 to about 5 weight percent of a phosphine oxide photoinitiator.

In another embodiment, the curable composition comprises the reaction product of (meth)acrylic acid with a di-epoxide that is bisphenol-A diglycidyl ether, bisphenol-F diglycidyl ether, tetrabromo bisphenol-A diglycidyl ether, tetrabromo bisphenol-F diglycidyl ether, 1,3-bis-{4-[1-methyl-1-(4-oxiranylmethoxy-phenyl)-ethyl]-phenoxy}-propan-2-ol, 1,3-bis-{2,6-dibromo-4-[1-(3,5-dibromo-4-oxiranylmethoxy-phenyl)-1-methyl-ethyl]-phenoxy}-propan-2-ol, or a combination comprising at least one of the forgoing di-epoxides; phenylthioethyl (meth)acrylate, phenoxyethyl (meth)acrylate, or a combination comprising at least one of the foregoing substituted or unsubstituted arylether (meth)acrylate monomer; pentabromobenzyl (meth)acrylate; and a phosphine oxide photoinitiator.

In yet another embodiment, a method of making the composition comprises blending a multifunctional (meth)acrylate, a substituted or unsubstituted arylether (meth)acrylate monomer, a brominated aromatic (meth)acrylate monomer, and a polymerization initiator.

Other embodiments include the reaction product obtained by curing any of the above curable compositions.

Still other embodiments include articles made from any of the cured compositions. Articles that may be fabricated from the compositions include, for example, optical articles, such as light management films for use in back-light displays; projection displays; traffic signals; illuminated signs; optical lenses; Fresnel lenses; optical disks; diffuser films; holographic substrates; or as substrates in combination with conventional lenses, prisms or mirrors.

The invention is further illustrated by the following non-limiting examples.

EXAMPLES

The formulations for the following Examples were prepared from the components listed in Table 1.

TABLE 1

| Component | Trade Name | Description | Source |
|---|---|---|---|
| RDX51027 | RDX51027 | Diacrylate of tetrabromo bisphenol-A di-epoxide | UCB Chemicals |
| PTEA | BX-PTEA | Phenylthioethyl acrylate | Bimax Company |
| PEA | SR339 | 2-Phenoxyethyl acrylate | Sartomer |
| PBrBA | FR1025M | Pentabromobenzyl acrylate | Ameribrom |
| Irgacure | Irgacure 819 | Bis(2,4,6-trimethylbenzoyl)-phenylphosphine oxide | Ciba-Geigy |
| Darocur | Darocur 4265 | 2-Hydroxy-2-methyl-1-phenyl-propan-1-one and Bis(2,4,6-trimethylbenzoyl)-phenylphosphine oxide | Ciba Specialty Chemicals |

Examples of cured flat films and cured microstructured films coated on a substrate were prepared according to the following procedures. As used in the Examples, coated films means a two-layered film of the composition and film substrate. Coated cured flat films having a 7 to 10 micrometer thick cured composition layer atop a 0.005-inch (0.127 centimeter) thick polycarbonate film substrate were prepared using a custom-made laminating unit and Fusion EPIC 6000 UV curing system. The laminating unit consists of two rubber rolls: a bottom variable speed drive roll and a pneumatically driven top nip roll. This system is used to press together laminate stacks that are passed between the rolls. The laminate stacks contain a tool (also known as a mold) with or without a desired geometry to replicate lying face up, a curable composition coated on the tool, and a film substrate on the top of the curable composition. The coated flat films were prepared by transferring approximately 0.5 mL of curable composition to a highly polished, flat, chrome-plated 5 by 7-inch (12.7 by 17.8 centimeter) steel plate tool in a continuous line at the front, or leading edge of the plate. A piece of film substrate was then placed over the curable composition and the resulting stack sent through the laminating unit to press and distribute the curable composition uniformly between the tool and film substrate. With higher viscosity formulations, higher pressure and lower speeds were used and the tool was heated to obtain the desired thickness. Photopolymerization of the curable composition within the stack was accomplished by passing the stack twice under a 600-watt V-bulb at a speed of 16 feet/minute (0.081 meters/second), using high power and a focal length of 2.1 inches (5.3 centimeter), curing through the film substrate top layer. The coated cured flat film was then peeled off of the flat tool and used for abrasion, % haze, % transmission, color, yellowness index, and adhesion measurements.

Coated cured microstructured films for measuring luminance were made in the same manner as coated cured flat films by substituting the highly polished flat steel plate for an electroformed tool with a prismatic geometry. The geometry of the prisms can be found in FIG. 6 of the copending U.S. application Ser. No. 10/065,981 entitled "Brightness Enhancement Film With Improved View Angle" filed Dec. 6, 2002, which is incorporated by reference herein in its entirety.

Glass transition temperatures (Tg) of the cured compositions were measured by dynamic mechanical analysis (DMA) using a Rheometrics Solids Analyzer RSA II operating in tension with a frequency of 1.0 rad/s, strain of 0.01%, and temperature ramp of 2° C./minute. Cured free films (no film substrate) for DMA were prepared by placing approximately one gram of a curable composition into an aluminum pan having a 2 inch (5.08 centimeter) diameter, spreading the curable composition across the bottom of the pan by tilting it, and photopolymerizing the composition under a nitrogen atmosphere. If the curable composition was viscous, the pan and curable composition were mildly heated to reduce the viscosity and enhance the flowability. Photopolymerization was accomplished using a Fusion EPIC 6000 UV processor equipped with a 600 watt V-bulb. The distance of the lamp from the conveyor belt was 2.1 inches (5.3 centimeter). The belt speed used was 16 feet/minute (0.081 meters/second) and the sample was passed under the lamp three times.

The refractive index (RI) of the liquid curable compositions was measured using a Bausch and Lomb Abbe-3L refractometer; the wavelength associated with the measurement was 589.3 nanometers.

The percent (%) haze and % transmission of light through the coated cured flat films were determined according to ASTM D1003 using a BYK-Gardner Haze-guard Plus Hazemeter.

Oscillating Sand Abrasion Test (OST % haze) was performed on the coated cured flat films using a modification to the procedure described in ASTM F735. The major modification consisted of a change in the mode of sand oscillation from linear oscillation to circular oscillation. The apparatus used for the abrasion process was a vortex shaker manufactured by Glas-Col Company equipped with a metal tray to hold the sample and sand. The sand was silica sand from Fairmount Minerals of Wedron, Ill. (C.A.S. 14808-60-7). One thousand milliliters of sand and an oscillation time of 10 minutes were used for the test. The change in haze after the sand abrasion test was used to represent abrasion resistance.

The brightness of the coated cured microstructured films was determined using the Display Analysis system Microvision SS220. Microvision SS220, a computer based measurement system, uses a goniometric assembly and a mechanical positioner for the collection of in-axis and off-axis data at various locations of the films. The brightness measurements are achieved by utilizing a diffraction grating spectrometer with a collimation optical probe. The microstructured or light management film is mounted on an LG-Phillips backlight module, which is composed of a bottom diffuser D177 and crossed light management films. A 13 point test and hemi test are conducted to provide the uniformity of the brightness over 13 specific locations on the film and the range of viewing angle at the center location of the film. The brightness is provided in units of candela per meter squared (cd/m$^2$).

The adhesion was measured for the coated cured flat film according to ASTM D3359.

The viscosity for each curable composition included in the following examples was measured using a Brookfield LVDV-II Cone/Plate Viscometer at 25° C., with a CPE40 or CPE51 spindle attachment, 0.5 mL liquid curable composition sample volume while maintaining a torque range within 15% to 90% of the equipment maximum for the specific cone attachment. The viscosity measurements are provided in centipoise (cP).

The color of the coated cured flat films was determined by measuring L*, a*, and b* using a Gretag Macbeth Color-Eye 7000A colorimeter using L*, a*, b* color space, the D65 illuminant, and a 10 degree observer inclusive of a specular reflection.

The yellowness index (YI) of the coated cured flat films was measured using a Gretag Macbeth Color-Eye 7000A colorimeter.

Table 2 provides glass transition temperature data for free films made from PTEA and RDX$^{51027}$ (Examples 1–4) and free films made from PTEA, RDX51027, and PBrBA (Examples 5–8). The results illustrate the dramatic increase in Tg of the resulting cured compositions made from formulations containing PBrBA. In the following tables, all of the amounts are shown in weight percent based on the total weight of the composition, with the actual amount of each component of the formulation enclosed in parenthesis (in grams).

TABLE 2

| | Components in Weight percent (grams) | | | | |
|---|---|---|---|---|---|
| Example | RDX51027 | PTEA | PBrBA | Irgacure | Tg (° C.) |
| 1 | 69.5 (7) | 30 (3) | — | 0.5 (0.05) | 90 |
| 2 | 59.5 (6) | 40 (4) | — | 0.5 (0.05) | 63 |
| 3 | 49.5 (5) | 50 (5) | — | 0.5 (0.05) | 47 |
| 4 | 39.5 (4) | 60 (6) | — | 0.5 (0.05) | 28 |
| 5 | 69.5 (7) | 21 (2.1) | 9 (0.9) | 0.5 (0.05) | 99 |
| 6 | 59.5 (6) | 28 (2.8) | 12 (1.2) | 0.5 (0.05) | 86 |
| 7 | 49.5 (5) | 35 (3.5) | 15 (1.5) | 0.5 (0.05) | 71 |
| 8 | 39.5 (4) | 42 (4.2) | 18 (1.8) | 0.5 (0.05) | 54 |

Table 3 provides glass transition data for free films made from PEA and RDX51027 (Examples 9, 13, 17, and 21) and free films made from PEA, RDX51027, and PBrBA (Examples 10–12, 14–16, 18–20, and 22–24). The results illustrate the dramatic increase in Tg of the resulting cured compositions containing PBrBA. Again, the amounts are shown in weight percent with the actual amount of each component of the formulation enclosed in parenthesis (in grams).

TABLE 3

| | Components in Weight percent (grams) | | | | Tg |
|---|---|---|---|---|---|
| Example | RDX51027 | PEA | PBrBA | Irgacure | (° C.) |
| 9 | 69.5 (7) | 30 (3) | — | 0.5 (0.05) | 93 |
| 10 | 69.5 (7) | 27 (2.7) | 3 (0.3) | 0.5 (0.05) | 101 |
| 11 | 69.5 (7) | 24 (2.4) | 6 (0.6) | 0.5 (0.05) | 106 |
| 12 | 69.5 (7) | 21 (2.1) | 9 (0.9) | 0.5 (0.05) | 112 |
| 13 | 59.5 (6) | 40 (4) | — | 0.5 (0.05) | 74 |
| 14 | 59.5 (6) | 36 (3.6) | 4 (0.4) | 0.5 (0.05) | 79 |
| 15 | 59.5 (6) | 32 (3.2) | 8 (0.8) | 0.5 (0.05) | 91 |
| 16 | 59.5 (6) | 28 (2.8) | 12 (1.2) | 0.5 (0.05) | 96 |
| 17 | 49.5 (5) | 50 (5) | — | 0.5 (0.05) | 57 |

TABLE 3-continued

| | Components in Weight percent (grams) | | | Tg |
|---|---|---|---|---|
| Example | RDX51027 | PEA | PBrBA | Irgacure | (° C.) |
| 18 | 49.5 (5) | 45 (4.5) | 5 (0.5) | 0.5 (0.05) | 65 |
| 19 | 49.5 (5) | 40 (4.0) | 10 (1.0) | 0.5 (0.05) | 70 |
| 20 | 49.5 (5) | 35 (3.5) | 15 (1.5) | 0.5 (0.05) | 78 |
| 21 | 39.5 (4) | 60 (6) | — | 0.5 (0.05) | 45 |
| 22 | 39.5 (4) | 54 (5.4) | 6 (0.6) | 0.5 (0.05) | 48 |
| 23 | 39.5 (4) | 48 (4.8) | 12 (1.2) | 0.5 (0.05) | 56 |
| 24 | 39.5 (4) | 42 (4.2) | 18 (1.8) | 0.5 (0.05) | 66 |

Table 4 displays formulations for compositions of RDX51027, PTEA, and PBrBA.

TABLE 4

| | Components in Weight percent (grams) | | | | |
|---|---|---|---|---|---|
| Example | RDX51027 | PTEA | PBrBA | PTEA:PBrBA | Irgacure |
| 25 | 69.5 (10.46) | 27 | 3 | 90:10 (4.48) | 0.5 (0.08) |
| 26 | 59.5 (10.15) | 36 | 4 | 90:10 (6.77) | 0.5 (0.085) |
| 27 | 49.5 (9.54) | 45 | 5 | 90:10 (9.54) | 0.5 (0.095) |
| 28 | 39.5 (11.33) | 54 | 6 | 90:10 (17.00) | 0.5 (0.14) |
| 29 | 69.5 (10.96) | 24 | 6 | 80:20 (4.70) | 0.5 (0.078) |
| 30 | 59.5 (9.58) | 32 | 8 | 80:20 (6.39) | 0.5 (0.080) |
| 31 | 49.5 (10.43) | 40 | 10 | 80:20 (10.43) | 0.5 (0.104) |
| 32 | 39.5 (9.13) | 48 | 12 | 80:20 (13.70) | 0.5 (0.114) |

Table 5 displays data on free films and coated cured flat films produced from curing films of the compositions in Table 4. The results illustrate that increasing PBrBA concentration in the compositions increases refractive index (RI) and Tg of the curable composition and cured free films, respectively.

Table 6 displays formulations based on compositions derived from RDX51027, PTEA, and PBrBA.

TABLE 6

| | Components in Weight percent (grams) | | | |
|---|---|---|---|---|
| Example | RDX51027 | PTEA | PBrBA | Irgacure |
| 33 | 29.5 (5.9) | 56 (11.2) | 14 (2.8) | 0.5 (0.1) |
| 34 | 29.5 (5.9) | 70 (14) | — | 0.5 (0.1) |
| 35 | 49.5 (9.9) | 50 (10.0) | — | 0.5 (0.1) |
| 36 | 49.5 (9.9) | 45 (9.0) | 5 (1.0) | 0.5 (0.1) |
| 37 | 49.5 (9.9) | 40 (8.0) | 10 (2.0) | 0.5 (0.1) |
| 38 | 69.5 (13.9) | 30 (6.0) | — | 0.5 (0.1) |
| 39 | 69.5 (13.9) | 27 (5.4) | 3 (0.6) | 0.5 (0.1) |
| 40 | 69.5 (13.9) | 24 (4.8) | 6 (1.2) | 0.5 (0.1) |

Table 7 displays data on free films, coated cured flat films as well as coated cured microstructured films produced from the compositions in Table 6. Brightness of the samples in Table 7 were measured on the same day to offset day to day variations in brightness readings. The results of Examples 33 and 34 illustrate that the presence of PBrBA in the compositions provides an unexpected increase in brightness in the resulting microstructured films. Furthermore, the addition of only small amounts of PBrBA to formulations containing

TABLE 5

| | Examples | | | | | | | |
|---|---|---|---|---|---|---|---|---|
| Properties | 25 | 26 | 27 | 28 | 29 | 30 | 31 | 32 |
| RI Measured (liquid) | 1.594 | 1.589 | 1.582 | 1.581 | 1.596 | 1.593 | 1.588 | 1.585 |
| % Haze | 0.17 | 0.44 | 1.27 | 1.23 | 1.27 | 1.25 | 1.28 |
| OST % Haze | 81.1 | 77.0 | 68.0 | 65.7 | 77.8 | 76.7 | 77.9 | 38.4 |
| Adhesion | 0B | 5B | 5B | 5B | 0B | 0B | 1B | 5B |
| Viscosity (cP) | NA | 2,130 | 580 | 135 | NA | 3,570 | 873 | 250 |
| Tg (° C.) | 98 | 74 | 48 | 38 | 101 | 80 | 30 | 52 |
| L* | 95.7 | 95.9 | 95.8 | 95.8 | 95.7 | 95.8 | 95.8 | 95.8 |
| a* | −0.1 | 0.0 | 0.0 | 0.0 | −0.2 | 0.0 | 0.0 | 0.0 |
| b* | 0.5 | 0.3 | 0.3 | 0.3 | 0.8 | 0.4 | 0.3 | 0.3 |
| YI | 0.8 | 0.5 | 0.4 | 0.4 | 1.2 | 0.6 | 0.5 | 0.4 | about 70 percent of the RDX compound resulted in free films having substantially increased Tg (Examples 38–40).

TABLE 7

| | Examples | | | | | | | |
|---|---|---|---|---|---|---|---|---|
| Properties | 33 | 34 | 35 | 36 | 37 | 38 | 39 | 40 |
| RI Measured (liquid) | 1.579 | 1.569 | 1.5777 | 1.5818 | 1.5861 | 1.5878 | 1.5910 | 1.5942 |
| % Haze | 0.59 | 0.55 | 0.61 | 0.65 | 0.67 | 0.64 | 0.60 | 0.64 |
| Adhesion | 5B | 5B | 5B | 5B | 5B | 5B | 5B | 5B |
| Viscosity (cP) | 56 | 29 | 216 | 334 | 533 | 5,743 | 10,629 | 20,481 |
| Tg (° C.) | 33 | 28 | 49 | 54 | 66 | 88 | 95 | 106 |
| L* | 95.8 | 95.9 | 95.9 | 95.9 | 95.8 | 95.9 | 95.9 | 95.9 |

TABLE 7-continued

| Properties | Examples | | | | | | | |
|---|---|---|---|---|---|---|---|---|
| | 33 | 34 | 35 | 36 | 37 | 38 | 39 | 40 |
| a* | 0.0 | 0.0 | 0.0 | 0.0 | 0.0 | 0.0 | 0.0 | 0.0 |
| b* | 0.4 | 0.3 | 0.4 | 0.4 | 0.4 | 0.3 | 0.3 | 0.4 |
| YI | 0.6 | 0.6 | 0.6 | 0.6 | 0.6 | 0.5 | 0.6 | 0.6 |
| Transmission (%) | 92.7 | 92.7 | 92.7 | 92.8 | 92.8 | 92.9 | 92.7 | 92.7 |
| Brightness (cd/m$^2$) | 1491 | 1431 | — | — | — | — | — | — |

Table 8 provides the formulations for compositions comprising RDX51027, PEA, and PBrBA.

TABLE 8

| | Components in Weight percent (grams) | | | |
|---|---|---|---|---|
| Example | RDX51027 | PEA | PBrBA | Irgacure |
| 41 | 29.5 (5.9) | 56 (11.2) | 14 (2.8) | 0.5 (0.1) |
| 42 | 29.5 (5.9) | 70 (14) | — | 0.5 (0.1) |
| 43 | 49.5 (9.9) | 50 (10.0) | — | 0.5 (0.1) |
| 44 | 49.5 (9.9) | 47.5 (9.5) | 2.5 (0.5) | 0.5 (0.1) |

Table 9 displays data on free films, coated cured flat films, and coated cured microstructured films produced from curing the compositions in Table 8. As with the PTEA formulations of Table 6 and 7, the results in Examples 41 and 42 illustrate that the presence of PBrBA in the PEA containing compositions provides an unexpected increase in brightness in the resulting microstructured films. Also, the addition of minor amounts of PBrBA to the formulations containing about 70% of the RDX compound resulted in cured free films having significantly increased Tg (Examples 47–49).

TABLE 9

| Properties | Examples | | | |
|---|---|---|---|---|
| | 41 | 42 | 43 | 44 |
| RI Measured (liquid) | 1.552 | 1.538 | 1.5530 | 1.5563 |
| % Haze | 0.59 | 0.47 | 0.63 | 0.66 |
| Adhesion | 5B | 5B | 5B | 5B |
| Viscosity (cP) | 96 | 49 | 362 | 451 |
| Tg (° C.) | 48 | 31 | 58 | 60 |
| L* | 96.0 | 96.1 | 96.0 | 96.0 |
| a* | 0.0 | 0.0 | 0.0 | 0.0 |
| b* | 0.3 | 0.3 | 0.3 | 0.3 |
| YI | 0.5 | 0.5 | 0.5 | 0.5 |
| Transmission (%) | 92.9 | 93.2 | 93.1 | 93.1 |
| Brightness (cd/m$^2$) | 1470 | 1387 | — | — |

| Properties | Examples | | | | |
|---|---|---|---|---|---|
| | 45 | 46 | 47 | 48 | 49 |
| RI Measured (liquid) | 1.5617 | 1.5650 | 1.5719 | 1.5764 | 1.5803 |
| % Haze | 0.65 | 0.62 | .60 | .60 | .68 |
| Adhesion | 5B | 5B | 5B | 5B | 5B |
| Viscosity (cP) | 743 | 1015 | 11,179 | 19,316 | 34,459 |
| Tg (° C.) | 67 | 69 | 97 | 104 | 113.5 |
| L* | 96 | 96.0 | 96.0 | 95.9 | 95.9 |
| a* | 0.0 | 0.0 | 0.0 | 0.0 | 0.0 |
| b* | 0.3 | 0.3 | 0.3 | 0.3 | 0.3 |
| YI | 0.5 | 0.5 | 0.5 | 0.5 | 0.5 |
| Transmission (%) | 93.0 | 93.0 | 92.9 | 92.9 | 92.6 |
| Brightness (%) | — | — | — | — | — |

TABLE 8-continued

| | Components in Weight percent (grams) | | | |
|---|---|---|---|---|
| Example | RDX51027 | PEA | PBrBA | Irgacure |
| 45 | 49.5 (9.9) | 42.5 (8.5) | 7.5 (1.5) | 0.5 (0.1) |
| 46 | 49.5 (9.9) | 40 (8.0) | 10 (2.0) | 0.5 (0.1) |
| 47 | 69.5 (13.9) | 30 (6.0) | — | 0.5 (0.1) |
| 48 | 69.5 (13.9) | 27 (5.4) | 3 (0.6) | 0.5 (0.1) |
| 49 | 69.5 (13.9) | 24 (4.8) | 6 (1.2) | 0.5 (0.1) |

Comparing similar samples of PTEA, RDX51027 and PBrBA (Example 33) with PEA, RDX51027 and PBrBA (Example 41) it is discovered that the formulation containing the PTEA has better RI than its PEA counterpart. Example 33 also provides a curable composition having a lower viscosity than Example 41, thereby providing better processability than a more viscous composition. Finally, Example 33 provides a cured microstructured film having improved brightness when compared to its PEA counterpart.

Table 10 provides the formulations of compositions comprising a combination of PTEA and PEA in addition to the RDX51027 and the PBrBA.

TABLE 10

| | Components in Weight percent (grams) | | | | |
|---|---|---|---|---|---|
| Example | RDX51027 | PEA | PTEA | PBrBA | Irgacure |
| 50 | 29.5 (5.9) | 35 (7.0) | 35 (7.0) | — | 0.50 (0.1) |
| 51 | 29.5 (5.9) | 31.5 (6.3) | 31.5 (6.3) | 7 (1.4) | 0.50 (0.1) |
| 52 | 29.5 (5.9) | 28 (5.6) | 28 (5.6) | 14 (2.8) | 0.50 (0.1) |

Table 11 provides the data of the cured free films and coated cured flat films based on the formulations found in Table 10. As shown in Table 11, the addition of PBrBA increases Tg of cured free films and RI of the curable composition.

TABLE 11

| | Examples | | |
|---|---|---|---|
| Properties | 50 | 51 | 52 |
| RI Measured (liquid) | 1.5525 | 1.5590 | 1.5662 |
| % Haze | 0.56 | 0.53 | 0.63 |
| Adhesion | 5B | 5B | 5B |
| Viscosity (cP) | 37 | 51 | 76 |
| Tg (° C.) | 25 | 31 | 37 |
| L | 96.0 | 95.9 | 95.9 |
| a | 0.0 | 0.0 | 0.0 |
| b | 0.3 | 0.3 | 0.3 |
| YI | 0.5 | 0.5 | 0.5 |
| Transmission (%) | 93.0 | 92.8 | 92.7 |

Since PBrBA is a powder and RDX51027 is a solid, the maximum amount of PBrBA that can be added to a blend of RDX51027 and substituted or unsubstituted arylether (meth)acrylate monomer is dependent on the solubility of PBrBA in the substituted or unsubstituted arylether (meth)acrylate monomer. The maximum solubility of PBrBA in PEA or PTEA was determined as follows. Solutions of PBrBA in PTEA, PEA, or 50/50 wt./wt. PTEA/PEA were prepared at different concentrations by heating the materials to promote solubility. The homogenous solutions were then allowed to sit overnight at room temperature and the appearance of crystallization was observed visually. The data obtained is shown in Table 12. The results show that PTEA offers higher solubility of PBrBA than PEA.

TABLE 12

| Wt. % PBrBA | Reactive Diluent | Crystallization overnight |
|---|---|---|
| 10 | PEA | No |
| 20 | PEA | No |
| 30 | PEA | Yes |
| 10 | PTEA | No |
| 20 | PTEA | No |
| 30 | PTEA | No |
| 10 | 50/50 PTEA/PEA | No |
| 20 | 50/50 PTEA/PEA | No |
| 30 | 50/50 PTEA/PEA | Yes |

Table 13 provides the formulations of compositions comprising either PEA or PTEA in addition to the RDX51027 without the presence of PBrBA. Furthermore, two different photoinitiators were used in the formulations. All amounts are in weight percent. The following Examples illustrate the unexpected increase in brightness of a formed microstructured film prepared from PTEA as compared to microstructured film prepared from PEA.

TABLE 13

| Example (No. of replicates) | Components in Weight Percent | | | | |
|---|---|---|---|---|---|
| | RDX51027 | PEA | PTEA | Irgacure | Darocur |
| 53 (3) | 59.75 | 39.75 | — | 0.5 | — |
| 54 (5) | 59.75 | — | 39.75 | 0.5 | — |
| 55 (3) | 59.75 | 39.75 | — | — | 0.5 |
| 56 (3) | 59.75 | — | 39.75 | — | 0.5 |

Table 14 provides brightness data measured on the same day for microstructured films for two comparisons of PEA and PTEA formulations, Examples 53–56. Both absolute brightness and relative brightness as compared to a daily standard are included with 95% confidence intervals; the number of replicated samples is included in parentheses with the Example number.

TABLE 14

| Optical Performance | Examples (No. of replicates) | | | |
|---|---|---|---|---|
| | 53 (3) | 54 (5) | 55 (3) | 56 (3) |
| Brightness (cd/m$^2$) | 1095.69 | 1125.30 | 1092.84 | 1117.20 |
| 95% CI | 6.07 | 6.94 | 7.84 | 3.32 |
| Brightness (daily standard) | 100.52% | 102.08% | 100.26% | 102.11% |
| 95% CI | 0.55% | 0.62% | 0.72% | 0.30% |

Both comparisons show that there is statistically significant increase in brightness of the microstructure films when prepared from a composition containing PTEA rather than PEA.

Examples 57 to 62 were prepared to explore the relative degree of cure of compositions prepared from RDX51027, PTEA, and Irgacure 819 cured under a variety of conditions. Coated flat films were prepared as described above and according to the formulations described in Table 16. RX 02686 is an 80/20 (w/w) blend of RDX51027 and PTEA. The films of cured material were 20–30 micrometers in thickness.

The relative degree of cure of cured, coated films was determined by employing an Attenuated Total Reflectance Fourier Transform Infrared Spectroscopy (ATR-FTIR) analysis method. Attenuated total reflectance (ATR) spectra of both the uncured composition and the corresponding cured films were obtained. Specifically, the cured, coated films were cured using one of three different processing conditions as set out in Table 15 (dose in units of joules/cm$^2$). ATR spectra of cured, coated films were obtained by examining the film with a single-bounce ASI DiComp(R) accessory mounted in a Nicolet Magna(R) 750 FTIR. The instrument was configured with a potassium bromide (KBr) beamsplitter and an MCT-B detector. The film was placed over the diamond optical element with the coated side in contact with the diamond. Pressure was applied from the backside of the film to assure intimate contact. The maximum pressure obtainable was set by lowering the adjustable plunger on the DiComp accessory to its lowest position. Spectra were obtained at 2 wavenumber resolution by averaging 64 scans and performing the Fourier transform. The spectra were used without additional processing. Spectra of the uncured liquid materials were obtained by placing a drop of the liquid composition on the ATR diamond optical element.

TABLE 15

| | Conditions | | |
|---|---|---|---|
| | Low dose | Medium dose | High dose |
| Belt speed | 48 feet/minute | 48 feet/minute | 10 feet/minute |
| Lamp height | 8 inches | 2 inches | 2 inches |
| UVA dose | 0.176 | 0.289 | 1.631 |

The spectra were analyzed using the Nicolet OMNIC(R) software package. From the spectra, the area of two peaks between 1600 to 1645 cm$^{-1}$ corresponding to vinyl peaks of the composition was obtained. Additionally, the area of a peak at 1537 cm$^{-1}$ was obtained corresponding to a non-vinyl reference peak that is present in both the uncured material and cured films. From the peak areas, the relative degree of cure was calculated as follows:

$$\text{Relative degree of cure} = \left[\left(\frac{\text{vinyl liquid}}{1537 \text{ cm}^{-1} \text{ liquid}} - \frac{\text{vinyl cured}}{1537 \text{ cm}^{-1} \text{ cured}}\right) \middle/ \frac{\text{vinyl liquid}}{1537 \text{ cm}^{-1} \text{ liquid}}\right] \times 100$$

The ratio of the area of the vinyl peaks to the area of the reference peak for the uncured composition corresponds to "Vinyl liquid/1537 cm$^{-1}$ liquid" and is provided in Table 16 as "Vinyl/1537 liquid". The ratio of the area of the vinyl peaks to the area of the reference peak for the cured film corresponds to "Vinyl cured/1537 cm$^{-1}$ cured" and is provided in Table 16 as "Vinyl/1537 high dose", "Vinyl/1537 med. dose", and "Vinyl/1537 low dose" for cured films at high, medium, and low dose conditions of Table 15, respectively. From the ratios, the degree of cure was calculated and is provided in Table 16 along with additional property data of the resulting cured films.

TABLE 16

| | Examples | | | | | |
|---|---|---|---|---|---|---|
| | 57 | 58 | 59 | 60 | 61 | 62 |
| Components | | | | | | |
| RX 02686 (grams) | 18.62 | 18.25 | 20.96 | 20.59 | 23.31 | 22.94 |
| PTEA (grams) | 6.25 | 6.25 | 3.91 | 3.91 | 1.56 | 1.56 |
| Irgacure 819 (grams) | 0.13 | 0.50 | 0.13 | 0.50 | 0.13 | 0.50 |
| Properties | | | | | | |
| Viscosity @ 25° C. (cP) | 992 | 1,006 | 4,048 | 4,096 | 22,714 | 23,927 |
| RI liquid | 1.5878 | 1.5879 | 1.5911 | 1.5916 | 1.5955 | 1.5957 |
| Vinyl/1537 liquid | 1.9044 | 1.8503 | 1.2595 | | 1.1246 | 1.116 |
| Vinyl/1537 high dose | 0.1865 | 0.10812 | 0.1764 | 0.1386 | 0.2166 | 0.1521 |
| Vinyl/1537 med. dose | 0.1903 | 0.2310 | 0.2135 | 0.1622 | 0.3064 | 0.2429 |
| Vinyl/1537 low dose | 0.26784 | 0.22052 | 0.2310 | 0.1864 | 0.2959 | 0.2691 |
| Degree of cure high dose | 90.207 | 94.157 | 90.875 | 94.509 | 85.994 | 88.996 |
| Degree of cure med. dose | 90.007 | 87.516 | 81.726 | 89.682 | 83.049 | 87.122 |
| Degree of cure low dose | 85.936 | 88.082 | 80.002 | 88.457 | 81.659 | 85.200 |
| Adhesion low dose | 2B | 5B | 5B | 5B | 5B | 5B |
| Adhesion med. dose | 5B | 5B | 5B | 5B | 5B | 5B |
| Adhesion high dose | 5B | 5B | 5B | 5B | 5B | 5B |
| Haze low dose | 0.73 | 0.68 | 0.70 | 1.08 | 0.70 | 0.73 |
| Haze med. dose | 0.69 | 0.71 | 0.67 | 0.72 | 0.71 | 0.78 |
| Haze high dose | 0.76 | 0.72 | 0.73 | 0.70 | 0.98 | 0.82 |
| Transmission (%) low dose | 92.7 | 92.7 | 92.7 | 92.6 | 92.7 | 92.6 |
| Transmission (%) med. dose | 92.6 | 92.7 | 92.6 | 92.7 | 92.7 | 92.6 |
| Transmission (%) high dose | 92.7 | 92.7 | 92.7 | 92.7 | 92.5 | 92.5 |
| Abrasion low dose | 85.45 | 85.98 | 84.26 | 84.16 | 85.88 | 85.19 |
| Abrasion medium dose | 84.63 | 84.40 | 84.26 | 83.67 | 86.01 | 84.19 |
| Abrasion high dose | 82.21 | 81.48 | 82.09 | 81.49 | 81.3 | 81.56 |
| L* low dose | 95.8 | 95.8 | 95.8 | 95.8 | 95.8 | 95.8 |
| a* low dose | −0.1 | −0.3 | 0.0 | −0.2 | −0.1 | −0.5 |
| b* low dose | 0.4 | 0.8 | 0.4 | 0.8 | 0.5 | 1.2 |
| YI low dose | 0.6 | 1.1 | 0.6 | 1.0 | 0.6 | 1.3 |
| L* med. dose | 95.8 | 95.8 | 95.8 | 95.8 | 95.8 | 95.8 |
| a* med. dose | 0.0 | −0.2 | 0.0 | −0.2 | −0.1 | −0.3 |
| b* med. dose | 0.40 | 0.7 | 0.4 | 0.6 | 0.4 | 1.0 |
| YI med. dose | 0.6 | 1.0 | 0.6 | 0.9 | 0.6 | 1.3 |
| L* high dose | 95.8 | 95.8 | 95.8 | 95.8 | 95.8 | 95.8 |
| a* high dose | 0 | −0.1 | 0.0 | −0.1 | 0.0 | −0.1 |
| b* high dose | 0.4 | 0.5 | 0.4 | 0.5 | 0.4 | 0.6 |
| YI high dose | 0.6 | 0.7 | 0.6 | 0.7 | 0.6 | 0.9 |

As illustrated by the results in Table 16, the RDX and PTEA compositions provide a cured material having excellent properties and excellent degree of cure, often above 80 percent even when processed at a low dose of UVA radiation. Such a high degree of cure under the processing conditions outlined in Table 15 indicate that the compositions provided herein are well suited for the high speed production of cured, coated films, especially in continuous processes. The high degree of cure allows for increased productivity in the manufacturing process and the reduction of costs.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A curable composition, comprising:
   a multifunctional (meth)acrylate represented by the formula:

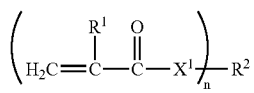

wherein $R^1$ is hydrogen or methyl; $X^1$ is O or S; n is at least 2; and $R^2$ is represented by the formula:

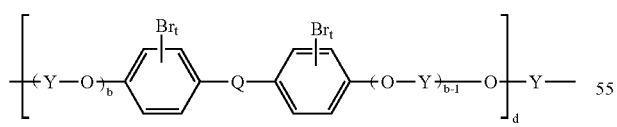

wherein Q is —C(CH$_3$)$_2$—, —CH$_2$—, —C(O)—, —S(O)—, or —S(O)$_2$—; Y is divalent $C_1$–$C_6$ alkyl or hydroxy substituted divalent $C_1$–$C_6$ alkyl; b is independently at each occurrence 1 to 10; t is independently at each occurrence 0, 1, 2, 3, or 4; and d is 1 to 3;
   a substituted or unsubstituted arylether (meth)acrylate monomer according to the formula:

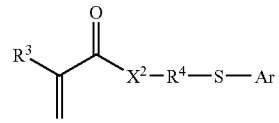

wherein $R^3$ is hydrogen or methyl; $X^2$ is O or S; $R^4$ is substituted or unsubstituted divalent $C_1$–$C_6$ alkyl or alkenyl; Ar is substituted or unsubstituted $C_6$–$C_{12}$ aryl, including phenyl; wherein the substitution on the $R^4$ and Ar independently include fluorine, chlorine, bromine, iodine, $C_1$–$C_6$ alkyl, $C_1$–$C_3$ perhalogenated alkyl, hydroxy, $C_1$–$C_6$ ketone, $C_1$–$C_6$ ester, N,N—($C_1$–$C_3$) alkyl substituted amide, or a combination comprising at least one of the forgoing substituents; and
   a polymerization initiator;
   wherein the curable composition is free of substituted or unsubstituted bis(4-(meth)acryloylthiophenyl)sulfide.

2. The composition of claim 1, comprising:
   about 25 to about 75 weight percent multifunctional (meth)acrylate;
   about 15 to about 70 weight percent substituted or unsubstituted arylether (meth)acrylate monomer; and
   about 0.1 to about 10 weight percent polymerization initiator based on the total weight of the composition.

3. The composition of claim 1, comprising:
   about 50 to about 70 weight percent multifunctional (meth)acrylate;
   about 30 to about 50 weight percent substituted or unsubstituted arylether (meth)acrylate monomer; and
   about 0.1 to about 10 weight percent polymerization initiator based on the total weight of the composition.

4. The composition of claim 1, wherein the multifunctional (meth)acrylate is the reaction product of (meth)acrylic acid with a di-epoxide comprising bisphenol-A diglycidyl ether; bisphenol-F diglycidyl ether; tetrabromo bisphenol-A diglycidyl ether; tetrabromo bisphenol-F diglycidyl ether; 1,3-bis-{4-[1-methyl-1-(4-oxiranylmethoxy-phenyl)-ethyl]-phenoxy}-propan-2-ol; 1,3-bis-{2,6-dibromo-4-[1-(3,5-dibromo-4-oxiranylmethoxy-phenyl)-1-methyl-ethyl]-phenoxy}-propan-2-ol; or a combination comprising at least one of the foregoing di-epoxides; and
   wherein the substituted or unsubstituted arylether (meth)acrylate monomer according to the formula:

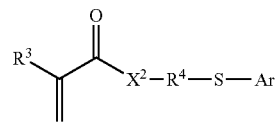

wherein $R^3$ is hydrogen or methyl; $X^2$ is O or S; $R^4$ is divalent $C_1$–$C_6$ alkyl; and Ar is phenyl.

5. The composition of claim 1, wherein the multifunctional (meth)acrylate is

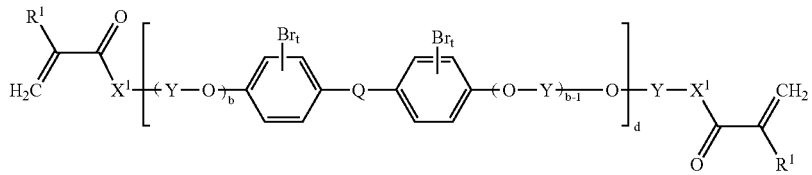

wherein Q is —C(CH$_3$)$_2$—, —CH$_2$—, —C(O)—, —S(O)—, or —S(O)$_2$—; Y is divalent C$_1$–C$_6$ alkyl or hydroxy substituted divalent C$_1$–C$_6$ alkyl; b is 1; t is 2; and d is 1; or wherein Q is —C(CH$_3$)$_2$—, —CH$_2$—, —C(O)—, —S(O)—, or —S(O)$_2$—; Y is divalent C$_1$–C$_6$ alkyl or hydroxy substituted divalent C$_1$–C$_6$ alkyl; b is 1; t is 2; and d is 2; or a combination thereof.

6. The composition of claim 1, wherein the substituted or unsubstituted arylether (meth)acrylate monomer is phenylthioethyl acrylate or phenylthioethyl methacrylate.

7. The composition of claim 1, further comprising a brominated aromatic (meth)acrylate monomer according to the formula:

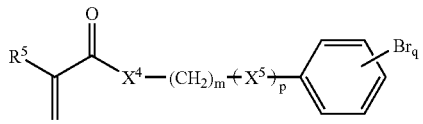

wherein R$^5$ is hydrogen or methyl; X$^4$ is O or S; X$^5$ is O or S; m is 1, 2, or 3; p is 0 or 1; and q is 1, 2, 3, 4, or 5.

8. The composition of claim 7, wherein the brominated aromatic (meth)acrylate monomer is tribromobenzyl (meth)acrylate, tribromophenyl (meth)acrylate, pentabromobenzyl (meth)acrylate, pentabromophenyl (meth)acrylate or a combination comprising at least one of the foregoing brominated aromatic (meth)acrylate monomers.

9. The composition of claim 7, wherein the brominated aromatic (meth)acrylate monomer is present at about 1 to about 20 weight percent based on the total weight of the composition.

10. The composition of claim 1, wherein the polymerization initiator is a phosphine oxide photoinitiator.

11. The composition of claim 1, further comprising a flame retardant, antioxidant, thermal stabilizer, ultraviolet stabilizer, dye, colorant, anti-static agent, surfactant, or a combination comprising at least one of the foregoing additives.

12. The composition of claim 1, wherein the refractive index of the composition is greater than or equal to about 1.58.

13. An optical film comprising a reaction product of the composition of claim 1.

14. The optical film of claim 13, comprising a degree of cure of greater than about 80 percent after exposure to a UVA dose of about 0.289 joules/cm$^2$.

15. An optical film for backlit displays comprising a reaction product of the composition of claim 1.

16. A curable composition, consisting essentially of:
a multifunctional (meth)acrylate represented by the formula:

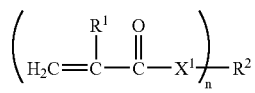

wherein R$^1$ is hydrogen or methyl; X$^1$ is O or S; n is at least 2; and R$^2$ is represented by the formula:

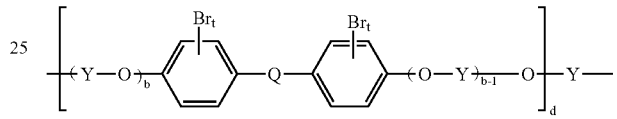

wherein Q is —C(CH$_3$)$_2$—, —CH$_2$—, —C(O)—, —S(O)—, or —S(O)$_2$—; Y is divalent C$_1$–C$_6$ alkyl or hydroxy substituted divalent C$_1$–C$_6$ alkyl; b is independently at each occurrence 1 to 10; t is independently at each occurrence 0, 1, 2, 3, or 4; and d is 1 to 3;

a substituted or unsubstituted arylether (meth)acrylate monomer according to the formula:

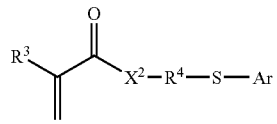

wherein R$^3$ is hydrogen or methyl; X$^2$ is O or S; R$^4$ is substituted or unsubstituted divalent C$_1$–C$_6$ alkyl or alkenyl; Ar is substituted or unsubstituted C$_6$–C$_{12}$ aryl, divalent C$_1$–C$_6$ including phenyl; wherein the substitution on the R$^4$ and Ar independently include fluorine, chlorine, bromine, iodine, C$_1$–C$_6$ alkyl, C$_1$–C$_3$ perhalogenated alkyl, hydroxy, C$_1$–C$_6$ ketone, C$_1$–C$_6$ ester, N,N—(C$_1$–C$_3$) alkyl substituted amide, or a combination comprising at least one of the forgoing substituents; and a polymerization initiator.

17. The curable composition of claim 16, consisting of
a multifunctional (meth)acrylate represented by the formula:

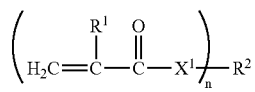

wherein R$^1$ is hydrogen or methyl; X$^1$ is O or S; n is at least 2; and R$^2$ is represented by the formula:

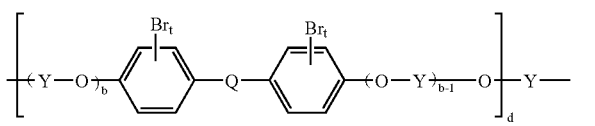

wherein Q is —C(CH$_3$)$_2$—, —CH$_2$—, —C(O)—, —S(O)—, or —S(O)$_2$—; Y is divalent C$_1$–C$_6$ alkyl or hydroxy substituted divalent C$_1$–C$_6$ alkyl; b is independently at each occurrence 1 to 10; t is independently at each occurrence 0, 1, 2, 3, or 4; and d is 1 to 3;

a substituted or unsubstituted arylether (meth)acrylate monomer according to the formula:

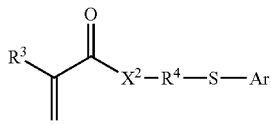

wherein R$^3$ is hydrogen or methyl; X$^2$ is O or S; R$^4$ is substituted or unsubstituted divalent C$_1$–C$_6$ alkyl or alkenyl; Ar is substituted or unsubstituted C$_6$–C$_{12}$ aryl, including phenyl; wherein the substitution on the R$^4$ and Ar independently include fluorine, chlorine, bromine, iodine, C$_1$–C$_6$ alkyl, C$_1$–C$_3$ perhalogenated alkyl, hydroxy, C$_1$–C$_6$ ketone, C$_1$–C$_6$ ester, N,N—(C$_1$–C$_3$) alkyl substituted amide, or a combination comprising at least one of the forgoing substituents; and a polymerization initiator.

18. A curable composition, comprising:

a multifunctional (meth)acrylate represented by the formula:

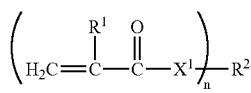

wherein R$^1$ is hydrogen or methyl; X$^1$ is O or S; n is at least 2; and R$^2$ is represented by the formula:

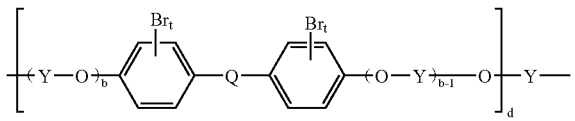

wherein Q is —C(CH$_3$)$_2$—, —CH$_2$—, —C(O)—, —S(O)—, or —S(O)$_2$—; Y is divalent C$_1$–C$_6$ alkyl or hydroxy substituted divalent C$_1$–C$_6$ alkyl; b is independently at each occurrence 1 to 10; t is independently at each occurrence 0, 1, 2, 3, or 4; and d is 1 to 3;

a substituted or unsubstituted arylether (meth)acrylate monomer represented by the formula:

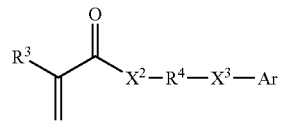

wherein R$^3$ is hydrogen or methyl; X$^2$ is O or S; X$^3$ is O or S; R$^4$ is substituted or unsubstituted divalent C$_1$–C$_6$ alkyl or alkenyl; Ar is substituted or unsubstituted C$_6$–C$_{12}$ aryl, including phenyl; wherein the substitution on the R$^4$ and Ar independently include fluorine, chlorine, bromine, iodine, C$_1$–C$_6$ alkyl, C$_1$–C$_3$ perhalogenated alkyl, hydroxy, C$_1$–C$_6$ ketone, C$_1$–C$_6$ ester, N,N—(C$_1$–C$_3$) alkyl substituted amide, or a combination comprising at least one of the forgoing substituents;

a brominated aromatic (meth)acrylate monomer represented by the formula:

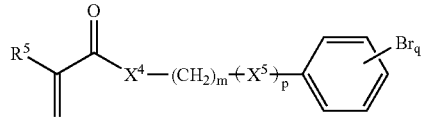

wherein R$^5$ is hydrogen or methyl; X$^4$ is O or S; X$^5$ is O or S; m is 1, 2, or 3; p is 0 or 1; and q is 4 or 5; and a polymerization initiator.

wherein the curable composition is free of substituted or unsubstituted bia(4-(meth)acryloylthiophenyl)sulfide.

19. The composition of claim 18, wherein the multifunctional (meth)acrylate is the reaction product of (meth)acrylic acid with a di-epoxide comprising bisphenol-A diglycidyl ether; bisphenol-F diglycidyl ether; tetrabromo bisphenol-A diglycidyl ether; tetrabromo bisphenol-F diglycidyl ether; 1,3-bis-{4-[1-methyl-1-(4-oxiranylmethoxy-phenyl)-ethyl]-phenoxy}-propan-2-ol; 1,3-bis-{2,6-dibromo-4-[1-(3,5-di-bromo-4-oxiranylmethoxy-phenyl)-1-methyl-ethyl]-phenoxy}-propan-2-ol; or a combination comprising at least one of the foregoing di-epoxides.

20. The composition of claim 18, wherein the substituted or unsubstituted arylether (meth)acrylate monomer is phenoxyethyl (meth)acrylate, phenylthioethyl (meth)acrylate, or a combination comprising at least one of the foregoing substituted or unsubstituted arylether (meth)acrylate monomers.

21. The composition of claim 18, wherein the brominated aromatic (meth)acrylate monomer is pentabromobenzyl (meth)acrylate, pentabromophenyl (meth)acrylate, or a combination comprising at least one of the foregoing brominated aromatic (meth)acrylate monomers.

22. The composition of claim 18, comprising about 25 to about 75 weight percent of the multifuictional (meth)acrylate;

about 15 to about 70 weight percent of the substituted or unsubstituted arylether (meth)acrylate monomer;

about 1 to about 20 weight percent of the brominated aromatic (meth)acrylate monomer; and about 0.1 to about 5 weight percent of a phosphine oxide photoinitiator based on the total weight of the composition.

23. An optical film comprising a reaction product of the composition of claim 18.

24. A method of making the composition of claim 1, comprising:

blending the multifunctional (meth)acrylate, the substituted or unsubstituted arylether (meth)acrylate monomer, and the polymerization initiator.

* * * * *